Aug. 26, 1947.                C. A. NERACHER ET AL                2,426,234
                                POWER TRANSMISSION
                     Original Filed June 26, 1941      8 Sheets-Sheet 2
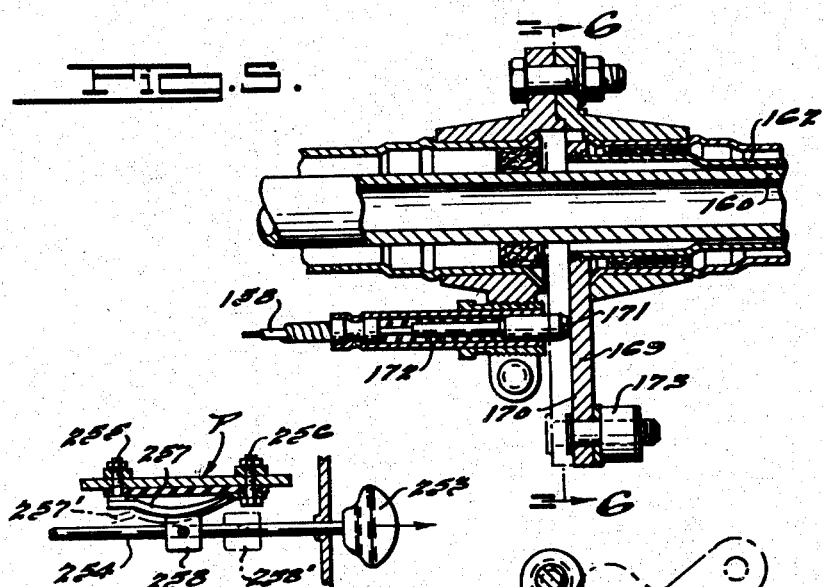
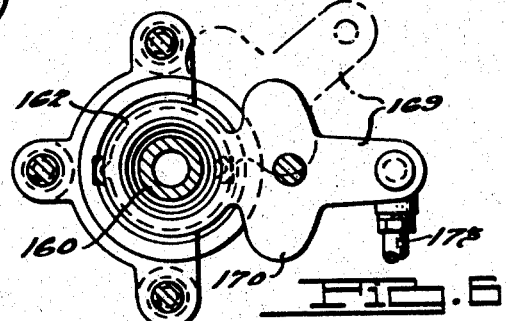
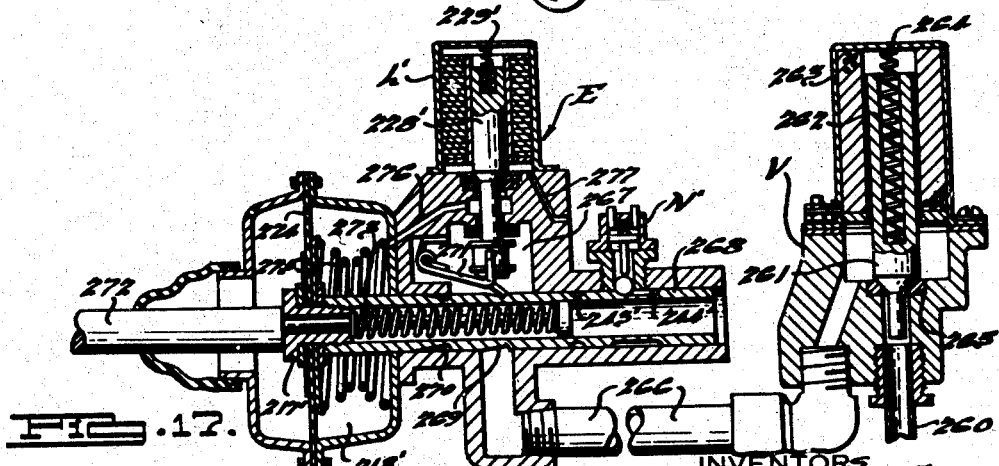

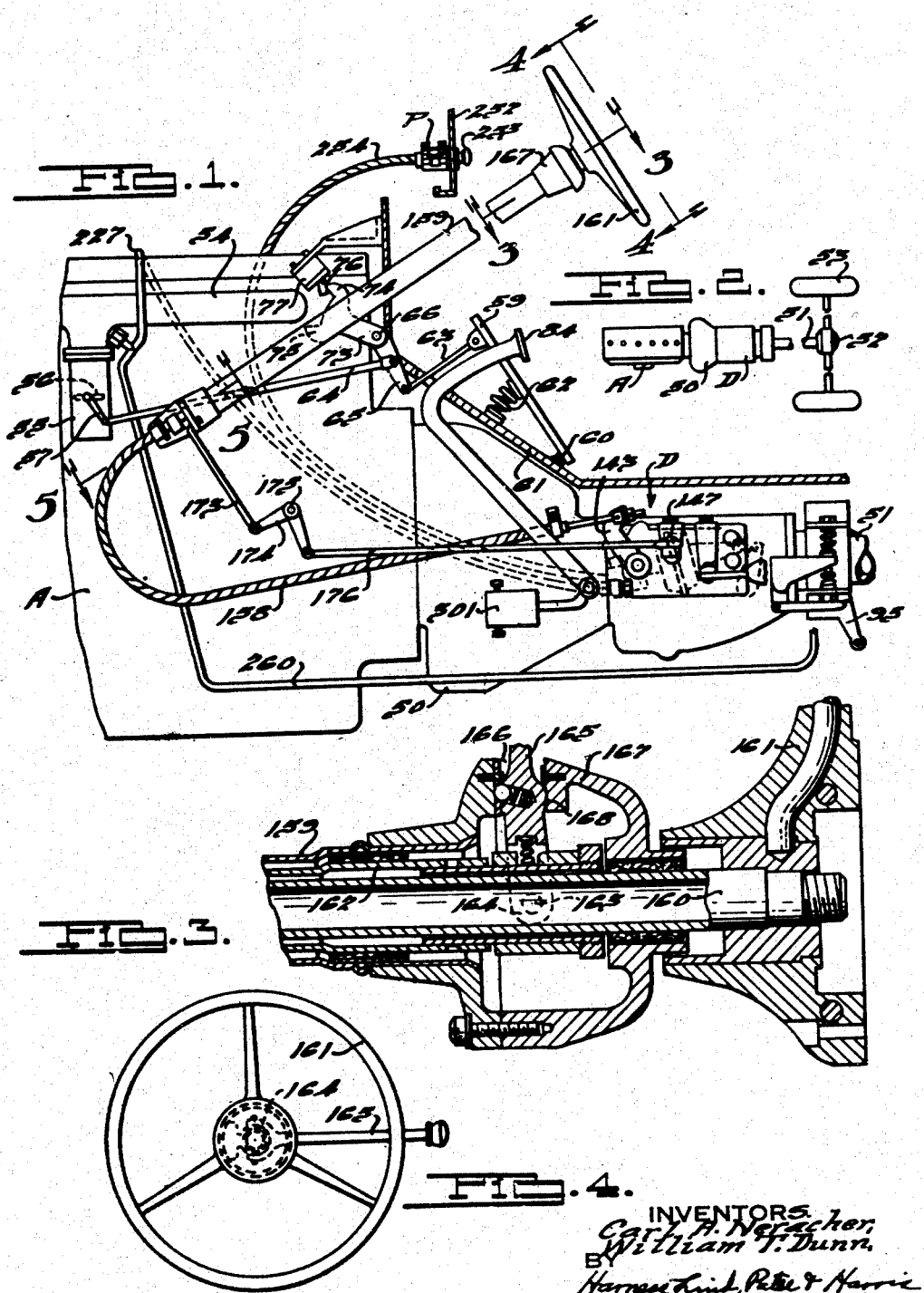

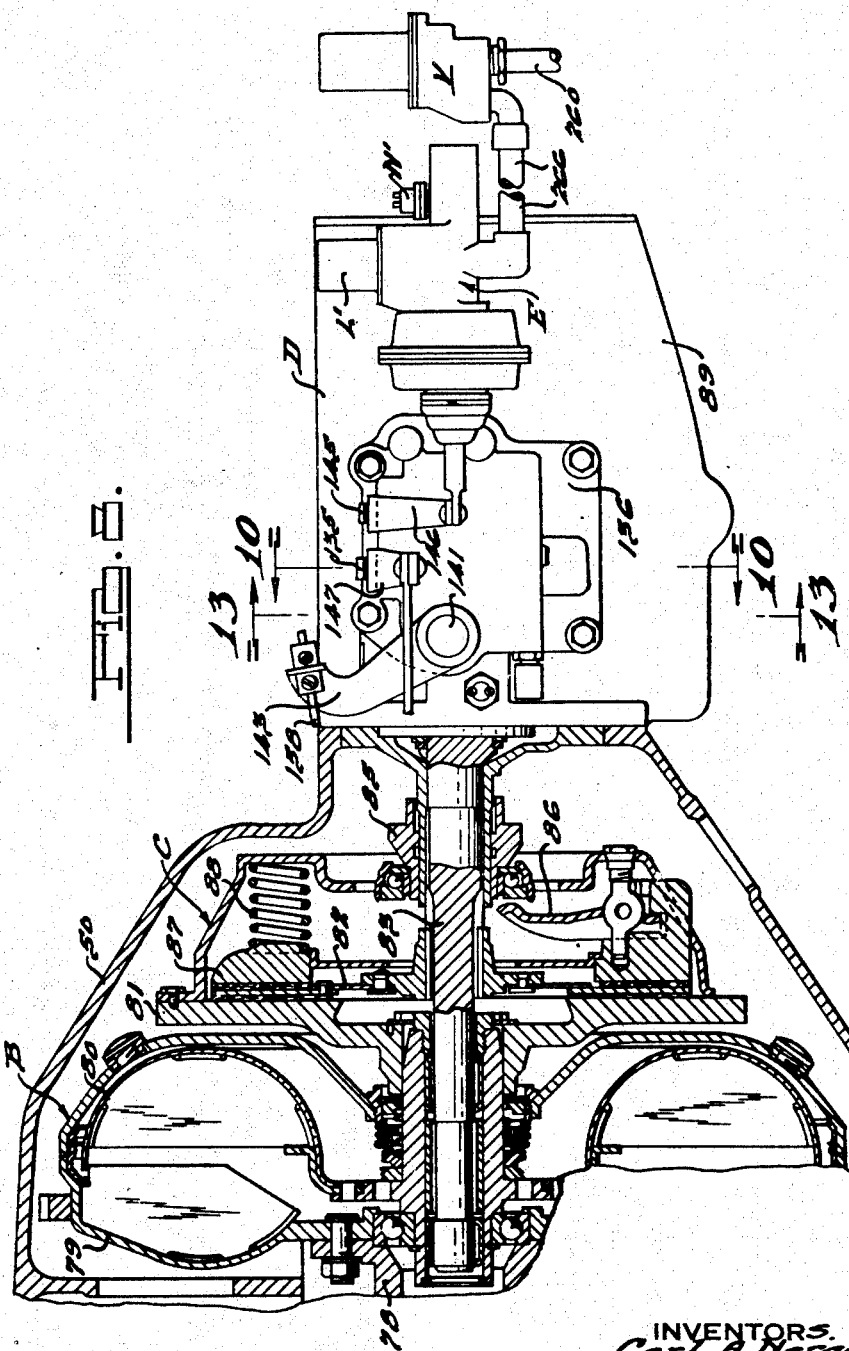

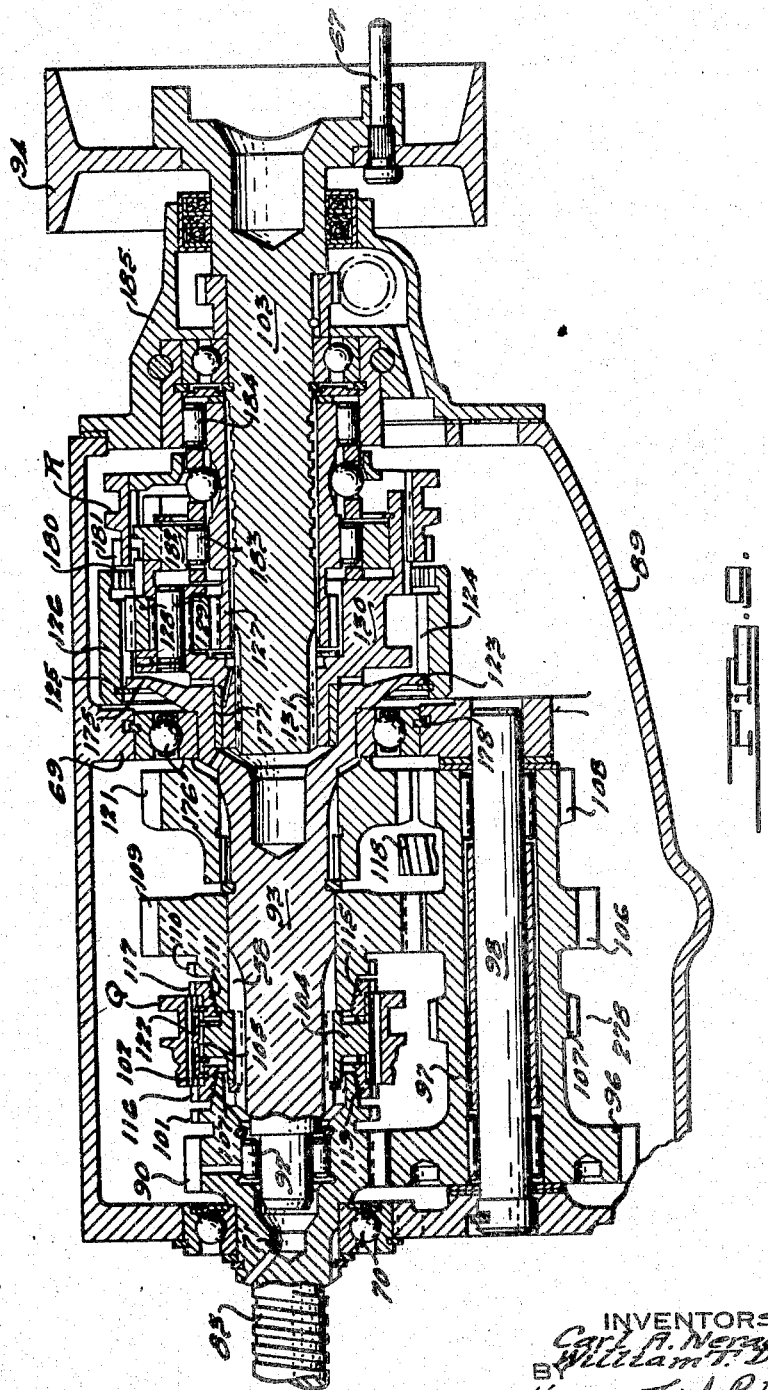

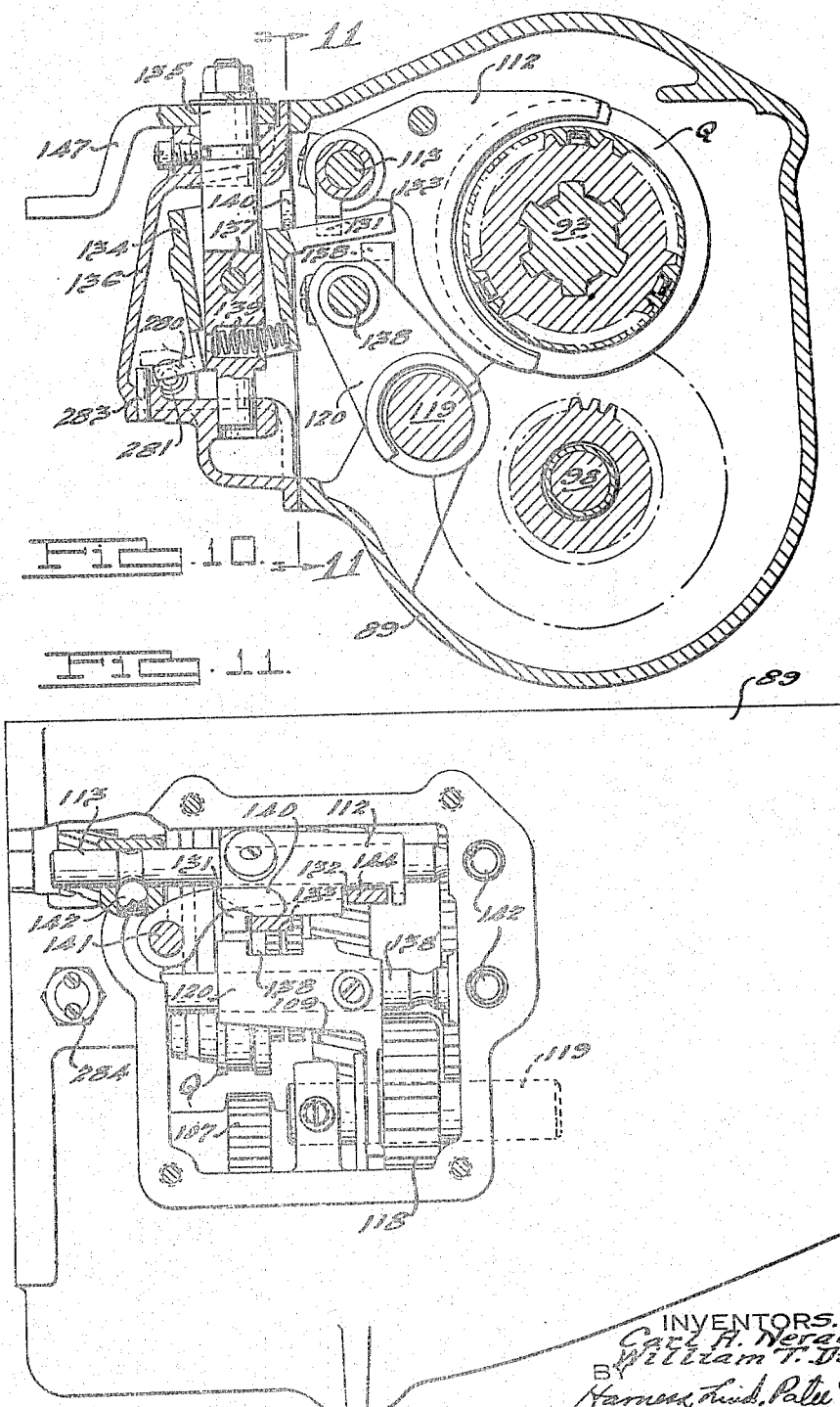

Aug. 26, 1947.    C. A. NERACHER ET AL    2,426,234
POWER TRANSMISSION
Original Filed June 26, 1941    9 Sheets-Sheet 6
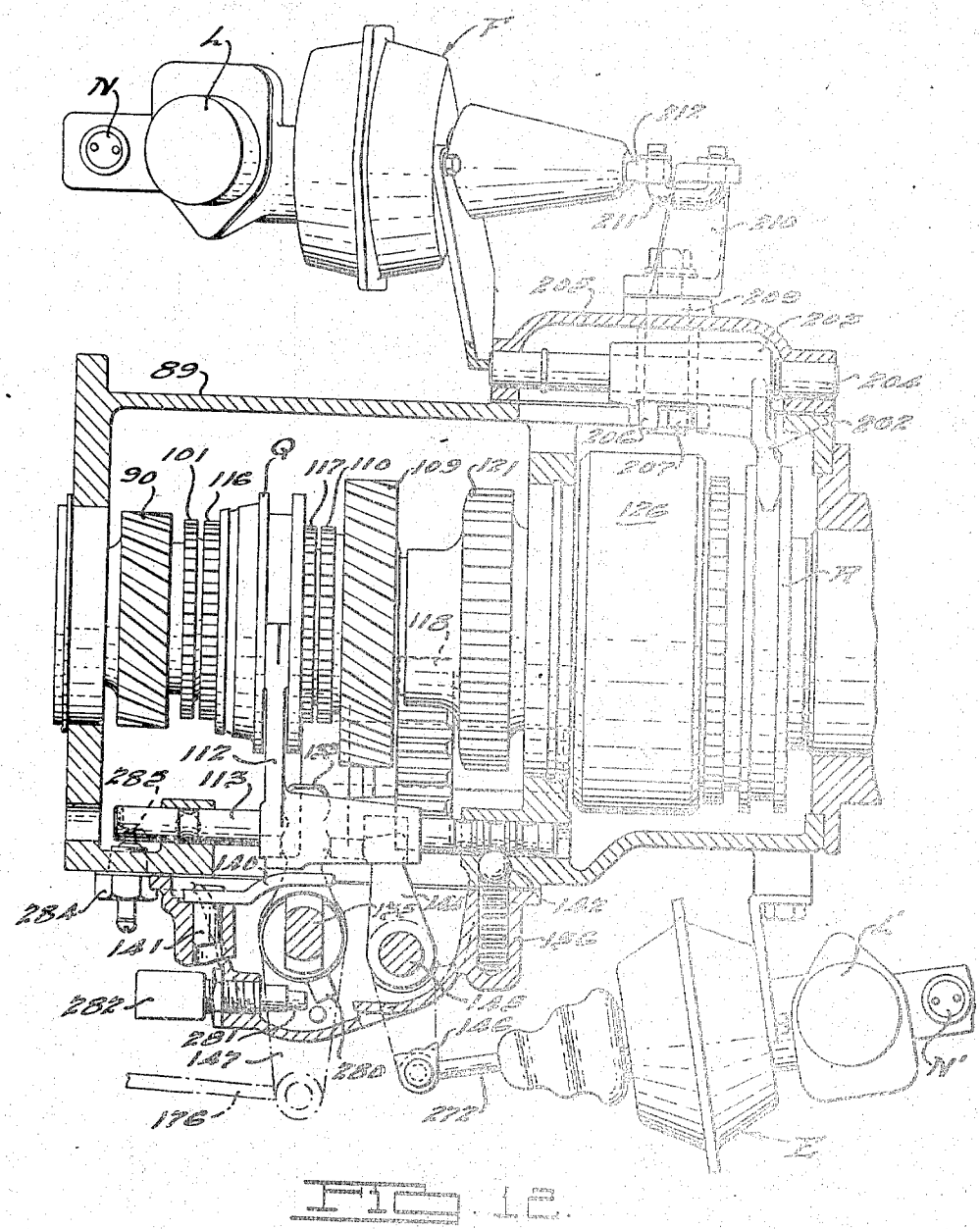

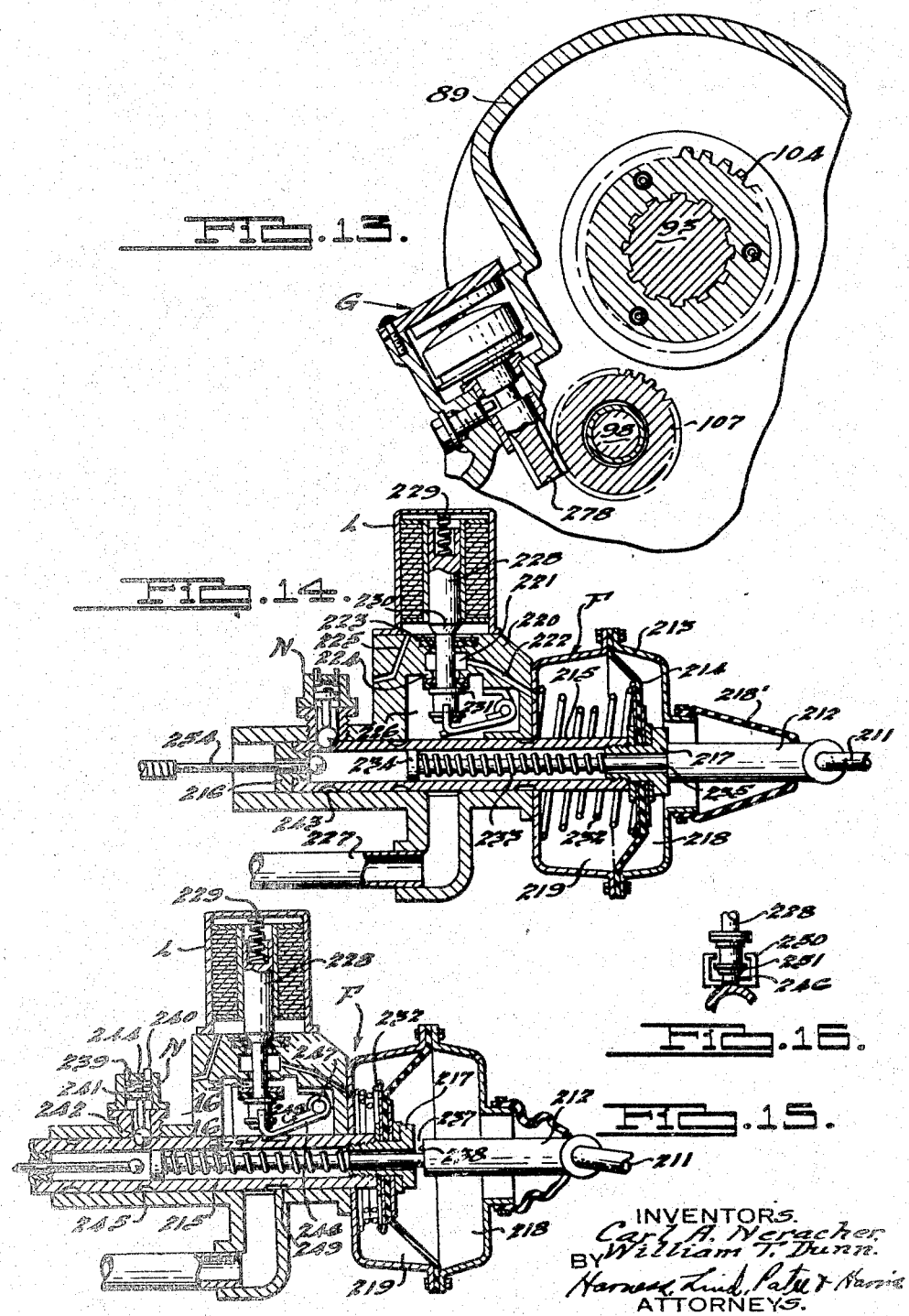

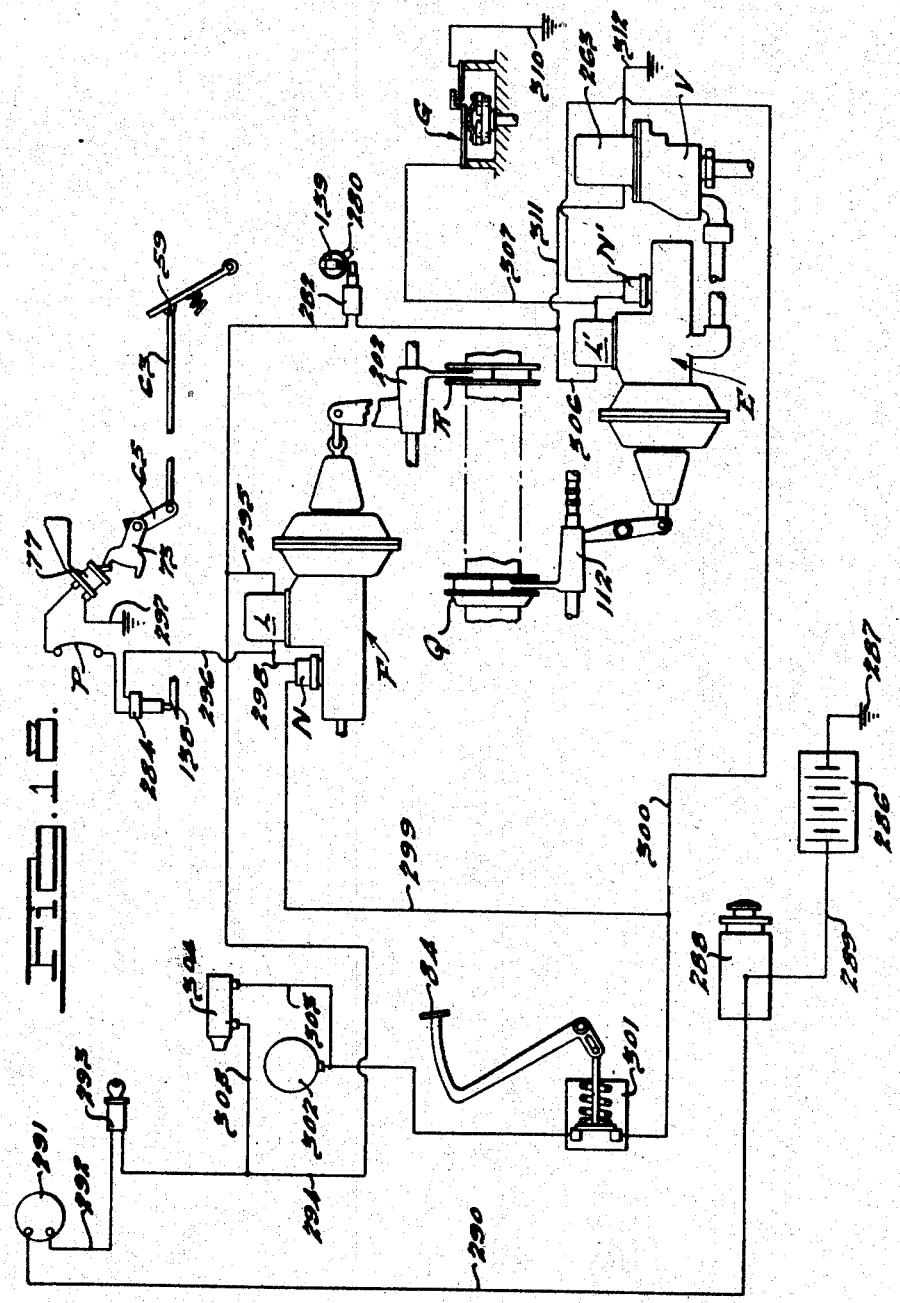

Patented Aug. 26, 1947

2,426,234

UNITED STATES PATENT OFFICE 2,426,234

POWER TRANSMISSION

Carl A. Neracher and William T. Dunn, Detroit, Mich., assignors to Chrysler Corporation, Highland Park, Mich., a corporation of Delaware Original application June 26, 1941, Serial No. 399,804. Divided and this application June 26, 1942, Serial No. 448,544

22 Claims. (Cl. 74—335)

This application is a division of our co-pending application, Serial No. 399,804, filed June 26, 1941.

This invention relates to power transmissions and is an improvement over the transmission described and claimed in the copending application of Carl A. Neracher et al., Serial No. 383,190, filed in the United States Patent Office on March 13, 1941, and which has eventuated in Patent No. 2,333,115, dated November 2, 1943.

In the transmission described and claimed in the aforesaid copending application Serial No. 383,190, two shiftable sleeves are provided, a forward sleeve adapted for manual shifting and a rear sleeve adapted to be shifted by power means, the arrangement being such that four different driving speed rations may be obtained. A typical arrangement of final drive ratios when used with a 3.54 to 1 rear axle ratio are as follows:

| First | 10.87 to 1 |
|---|---|
| Second | 7.00 to 1 |
| Third | 5.48 to 1 |
| Direct | 3.54 to 1 |

The aforesaid transmission is further arranged so that the driver may select a high range or low range by manipulation of the manually shiftable sleeve and an automatic shift of the power operated sleeve may be obtained in each range. For all normal driving, it is contemplated that the manually shiftable sleeve will remain in its high range position which restricts the choice of driving ratios to two, i. e., third and direct.

This means that all normal starts will be made in third speed ratio or 5.48 to 1, the vehicle being accelerated in this ratio to a speed in excess of 15 M. P. H. whereupon release of the accelerator pedal will permit an automatic shift of the rear sleeve to direct position giving a driving ratio of 3.54 to 1. The transmission also incorporates means for kickdown operation of the power shiftable sleeve whereby a return to 5.48 to 1 ratio may be effected under cruising conditions when it is desired to accelerate the vehicle at a fast rate.

It would be desirable to provide a higher ratio for starting, in the order of 7.00 to 1, for example, to enable a faster breakaway. However, due to the fact that the same driving ratio is used for kickdown acceleration at high speeds as is used for starting, some compromise must be resorted to because obviously a kickdown ratio of 7.00 to 1 would cause excessive engine R. P. M. at cruising speeds without substantially increasing the speed of the vehicle.

For this reason, the transmission gear reduction ratio controlled by the rear sleeve of the aforesaid transmission of said application Serial No. 383,190 was fixed at 1.55 to 1 (giving an overall driving ratio of 5.48 to 1) which is as low as can be considered satisfactory for kickdown operation.

In the present invention, we have provided a transmission similar to that described and claimed in the aforesaid Neracher et al. application Serial No. 383,190 which incorporates a second prime mover for power actuation of the manually shiftable sleeve. By suitably arranging the control instrumentalities, we have provided a combination wherein the rear sleeve is used for kickdown only and remains in direct drive position at all other times, while the forward sleeve is shifted by the second prime mover means from high range to low range automatically upon slowing down of the vehicle preparatory to coming to a stop. Thus all starts may be made in second speed ratio which provides a torque multiplication of 7 to 1. This arrangement permits a much faster start than is obtainable with a 5.48 to 1 ratio and is entirely automatic, no manual shifting of the sleeve being necessary.

Because of the fact that one sleeve is shifted to obtain a suitable starting ratio and the other is shifted for kickdown operation only, no compromising of ratios is necessary and the gears constituting each of the driving arrangements may be suitably proportioned to give proper operating speeds. By decreasing the transmission kickdown ratio from 1.55 to 1 to 1.45 to 1 (with a 3.54 to 1 axle), a more favorable ratio (5.14 to 1) for high speed operation is attained and the starting ratio of 7.00 to 1 is not disturbed although the first speed driving ratio is altered from 10.87 to 1 to 10.25 to 1. This highest ratio, however, is used only in cases of emergency or when an exceptionally fast get-away is desired and is perfectly satisfactory.

Accordingly, it is the principal object of the present invention to provide a simple and economically constructed power transmission which is adapted for full automatic operation.

A further object is to provide a transmission having a pair of shiftable sleeves, one of which is adapted to be shifted automatically in response to vehicle speed and the other of which is adapted to be shifted by power means at the will of the driver.

As pointed out above, our improved transmission provides a normal starting ratio of 7 to 1 which is adequate for all ordinary starts, particularly when used with a fluid coupling. However, when an exceptionally fast start is desired, the accelerator pedal may be fully depressed into its kickdown range whereupon the rear sleeve will be shifted to the underdrive position giving a starting ratio of 10.25 to 1.

Another advantage of the present arrangement resides in the provision made for manual as well as power shifting of the forward sleeve. With such an arrangement, the transmission is adapted for manual operation at all times and the manual operations necessary to select proper driving speed ratios during ordinary driving are greatly reduced.

Other advantages and objects of the invention will readily become apparent from a study of the following description:

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is a sectional view along line 5—5 of Fig. 1 showing a portion of the remote control shift.

Fig. 6 is a detail sectional view taken as indicated by the line 6—6 of Fig. 5.

Fig. 7 is an enlarged, sectional view of a portion of the dash mounted control of Fig. 1.

Fig. 8 is an enlarged side view, partly in section and partly in elevation, showing the Fig. 1 power transmission.

Fig. 9 is a sectional elevational view through the speed ratio changing transmission which is illustrated in elevation in Fig. 8.

Fig. 10 is a transverse sectional view looking forwardly as indicated by line 10—10 of Fig. 8, showing the transmission portion of the remote shift mechanism.

Fig. 11 is a side elevational view taken as indicated by line 11—11 of Fig. 10 and showing the transmission with the cover removed.

Fig. 12 is a horizontal sectional view of the transmission, the parts being shown in neutral position.

Fig. 13 is a fragmentary sectional view taken along line 13—13 of Fig. 8.

Fig. 14 is a sectional view through the upper vacuum operated servo-motor illustrated in elevation in Fig. 12.

Fig. 15 is a similar view showing the servo-motor in its actuated position.

Fig. 16 is a detail section along line 16—16 of Fig. 15.

Fig. 17 is a sectional view through the lower vacuum operated servo-motor of Fig. 12, the parts thereof being shown in neutral.

Fig. 18 is a wiring diagram of the transmission control mechanism.

We have illustrated the principles of our invention in connection with a motor vehicle drive wherein the usual engine A transmits its drive through clutching means B, C, within casing 50, the drive then passing through the change speed transmission D and propeller shaft 51 (Fig. 2) to the differential 52 and thence to the vehicle ground wheels 53 where it is desired to drive the rear wheels according to present day practice.

By preference, the arrangement is such that a "faster" rear axle ratio is afforded than is generally customary so that when the transmission is in direct drive, the car is driven in the equivalent of an overdrive ratio between the engine A and wheels 53. Our arrangement provides such conveniently operable kickdown or shift to a reduction drive from direct that the aforesaid arrangement is practicable thereby obtaining advantages of economy, long life and quietness of operation without the disadvantages of sluggish operation which is especially objectionable in city driving.

The engine A has the customary intake manifold 54 and carburetor riser 55 containing a throttle valve 56 operable by a lever 57 throughout a range of movement between the illustrated closed throttle position for engine idling and wide open throttle position. Lever 57 is adapted to be adjusted by a driver operable accelerator pedal 59 pivotally mounted at 60 on the toe board 61 to swing downwardly against a restoring spring 62 thereby to thrust through a system of pivotally jointed links 63, 64 and a connecting lever 65, the latter being pivotally supported at 66.

The lever 65 has fastened thereto a second lever 73 directed forwardly to provide spaced fingers 74, 75 in the path of an actuator 76 of a snap switch 77 which controls the kickdown shift mechanism.

The kickdown shift mechanism operates in response to manipulation of the accelerator pedal 59 to substantially wide open throttle position whereupon the engine is momentarily unloaded as by shorting the ignition thereof and disengagement of the synchronous clutch sleeve, which constitutes one of the automatically shiftable members in the transmission, is effected to change the transmission driving ratio from direct to underdrive. The throttle being open under such conditions will cause the engine to rapidly speed up as soon as the ignition circuit has been restored and the underdrive mechanism will automatically become effective as will be presently made apparent. The ignition circuit, after interruption during kickdown, is not dependent upon restoration of the pedal 59 but is restored by other means which will be described.

We preferably transmit the drive from the engine A to the transmission D through disengageable clutch means comprising a fluid coupling B of the kinetic type, preferably in conjunction with a releasable clutch C of conventional design, the latter being employed to facilitate manual shifts in the transmission D and to accommodate stopping of the car in gear without tendency of the coupling B to cause creep particularly in such instances where the engine idle is set high as during winter starting.

The engine crankshaft 78 drives the coupling impeller 79 to circulate the coupling fluid in the passages of the impeller and thereby to drive the runner 80 in the well known manner. The runner 80 drives the member 81 of the friction clutch C which may be of any commercial design. The driven clutch disk 82 is fixed to an intermediate drive shaft 83 and is drivingly disengaged by depressing clutch pedal 84 (Fig. 1) which slides the throw-out member 85 forwardly to operate lever 86 for unloading the clutch driving pressure plate 87, springs 88 loading this plate and engaging the clutch when pedal 84 is released.

Shaft 83 extends rearwardly into housing 89 of transmission D (Fig. 9) where it is formed with a main drive pinion 90 and a set of external clutch teeth 101 which are adapted to slidably engage internal clutch teeth 102 formed on the synchronous coupling clutch sleeve Q. A ball bearing 70 journals the shaft 83 in the casing 89 as illustrated.

Piloted in the hollow portion 71 of the rearward end of the shaft 83 by means of a bearing 92 is a shaft 93 having splined thereto at 58 a hub 104 formed with external teeth 105 slidably engaged with the internal teeth 102 of the shiftable clutch sleeve Q. The latter is adapted to be shifted forwardly or rearwardly by means of a shift yoke 112 fixed to a longitudinally extending shift rail 113 (Fig. 10) disposed on the left side of shaft 93 (as viewed when looking forwardly of the vehicle).

The intermediate transmission driven shaft 93 is adapted to drive the tailshaft 103 by means about to be described, the latter being in turn adapted for connection to the propeller shaft 51, fastening means 67 being provided. Tailshaft 103 is also adapted to carry a brake drum 94 having braking mechanism generally designated by reference numeral 95 (Fig. 1) operably associated therewith.

The drive pinion 90 is continuously meshed with a gear 96 which forms one of the gears of a countershaft cluster 97 rotatable on a countershaft support 98. The cluster 97 includes a gear 107 which drives a governor mechanism G (Fig. 13). The cluster 97 is further formed with gears 106 and 108. Gear 106 is in constant mesh with a gear 109 which is freely journalled on the shaft 93 and a gear 108 is adapted to mesh with a shiftable idler gear 118 when the latter is slid rearwardly on its countershaft 119 by means of a shift yoke 120 (Fig. 10). At such time idler gear 118 is also meshed with a gear 121 fixed to the shaft 93.

A pair of synchronizing blocker rings 119 and 115 are respectively disposed between the hub 104 and gears 90 and 109 and are driven with hub 104 with slight rotational clearance. These blockers have cam teeth 116 and 117 respectively having pitch circles the same as that of sleeve teeth 102 and teeth 101 and 110, the latter being formed integrally on the forward face of gear 109. The blocker rings 119 and 115 are provided with internal cone-shaped threaded surfaces which are adapted to frictionally engage the cone-shaped clutch surfaces 107 and 111 respectively formed integrally on the gears 90 and 109. If desired, energizing springs 122 may be provided between the blockers to lightly urge them into engagement with the cone surfaces 107 and 111 respectively so that the blocker teeth 116 and 117 are misaligned with the sleeve teeth 102 thereby preventing shift of the sleeve Q so long as the parts to be engaged are rotating at different speeds. These synchronizing blocker rings are more fully described and claimed in the copending application of Otto E. Fishburn, Serial No. 180,840, filed December 20, 1937, and which has eventuated in Patent No. 2,333,165, dated November 2, 1943, and reference is made thereto for a more complete description of the synchronizing blocker action thereof.

When the sleeve Q is moved forwardly, the teeth 102 thereof engage the cammed ends of the blocker teeth 116 thereby urging the blocker under pressure into engagement with the cone-shaped clutch surface 107 whereupon gear 90 tends to be synchronized with shaft 93. When the clutch teeth 101 and 116 are rotating in synchronization, the pressure on the blocker teeth will cause the blocker 119 to rotate slightly relative to hub 104 to permit the sleeve teeth 102 to pass through the blocker teeth 116 and engage teeth 101 thereby positively clutching shaft 93 with drive pinion 90. The rearward shift of sleeve Q to clutch with the teeth 110 of gear 109 is similarly synchronously affected under control of the blocker ring 115.

Referring now particularly to Figs. 10 and 11, it may be seen that the shift yoke 112 is provided with a lug 131 and a slot 132. The lug 131 is adapted to be engaged by a finger 133 carried by a trunnion member 134. The latter is carried by a rockshaft 135 journalled in the cover 136. A pin 137 rockably secures the trunnion 134 on the rockshaft as illustrated. The finger 133 is also adapted to engage a slot 138 in the reverse shift yoke 120 when rocked about the axis of the pin 137.

A spring 139 carried by the rockshaft 135 biases the trunnion 134 to such position that the finger 133 tends to remain engaged with the yoke 112. A lever 140 pivoted in the cover at 141 bears on the finger and is operable to rock the trunnion about the axis of pin 137 to engage the finger with the reverse shift yoke 120. Suitable detents 142 are provided to yieldably retain the rails in their shifted positions in accordance with usual practice.

The lever 140 is operated by a lever 143 (Figs. 1 and 8) pivoted on the outside of the cover 136 by means of the pin 141, a Bowden cable 158 being attached to the lower end thereof (Figs. 1 and 8). The rockshaft 135 is operated by a shift lever 147 which is attached by linkage about to be described to the manually operated remote shift apparatus.

The slot 132 in yoke 112 is adapted to receive a finger 144 carried by a rockshaft 145 to which a shift lever 146 is connected as shown in Figs. 8 and 12. The shift lever 146 is adapted for operation by a servo-motor E as will be described. The servo-motor E is preferably actuated by vacuum from the intake manifold 54 and is adapted to swing the lever 146 in one direction by spring pressure and in the opposite direction by differential fluid pressure operation of the piston.

The remote control mechanism for operating the shift lever 147 and Bowden wire mechanism 158 will now be described, reference being made to Figs. 1, 3 and 6, inclusive, and 10 to 12, inclusive. As may be seen from Figs. 1 and 3, the fixed steering post 159 of the vehicle housing the usual steering shaft 160 is operated by the hand engageable steering wheel 161. Rotatably journalled within the post 159 is a hollow shaft assembly 162 connected by pivot pins 163 with the yoked inner end 164 of a manually operable shift lever 165 which extends outwardly through an arcuate opening 166 formed in the head 167 which is fixed to post 159. Movement of lever 165 fore and aft about the axis of shaft 162 will oscillate this shaft about its axis while movement of the lever up and down will rock the lever about a fulcrum 168 to cause reciprocation of shaft 162 along its axis.

At the lower end of shaft 162, there is a lever 169 fixed thereto, this lever having an intermediate inside face portion 170 always engaged by the upper end of a plunger 171 fixed to the upper end of the Bowden wire 158. A spring 172 operates to yieldingly urge plunger 171 upwardly into engagement with lever face 170 as shown in Fig. 5. A link 173 has its forward end pivotally engaged with the outer end of the lever 169, the rearward end of this lever being connected to a bell-crank lever 174 pivotally mounted on the engine A at 175. The bellcrank operates a second link 176 which has articulated connection with the shift lever 147.

In order to effect reverse drive setting of the transmission as so far described, the lever 165 is first rocked upwardly about the fulcrum 168 to thereby push shaft 162 downwardly of the steering column and cause lever portion 170 to operate through the Bowden wire 158 to swing lever 143 (Fig. 1) clockwise about the pin 141 thereby rocking the trunnion 134 about pin 137 and engaging the finger 133 in slot 138 of yoke 120. The lever 165 may then be swung clockwise of the steering column to cause the lever 147 to rock shaft 135 and thrust yoke 120 rearwardly and effect rearward shift of rail 138 thereby meshing idler gear 118 with gears 108 and 121. Clutch C which is preferably released during manual shifting of sleeve Q and reverse idler gear 118 may then be engaged and the vehicle driven in reverse.

Forward drive setting of the transmission is effected by swinging shift lever 165 in a clockwise direction while in its lower path of movement whereupon lever 147 will be swung clockwise of Fig. 12 and finger 133 will be swung out of engagement with lug 131 of yoke 112. The spring in the servo-motor E (to be described in detail later on in this specification) will then move the yoke 112 rearwardly through the intermediary of the lever 146 and finger 144 and sleeve Q will be engaged with clutch teeth 110 of gear 109. Energization of motor E by means to be described will cause sleeve Q to be shifted to engage clutch teeth 101 of gear 90. When sleeve Q is in its rearward position the drive to shaft 93 is a reduction drive through gears 90, 96, 106 and 109; and when sleeve Q is in its forward position the shaft 93 is driven directly from shaft 83.

From the foregoing, it will be apparent that drive from the engine crankshaft 78 may be transmitted through the fluid coupling B and friction clutch C to the driven shaft 93 which may be driven at the speed of the shaft 83 and in the same direction; at a reduced speed and in the same direction with respect thereto; or at a reduced speed in a reverse direction with respect thereto.

Referring now again to Fig. 9, it will be seen that the shaft 95 terminates at its rearward end in an enlarged hollow portion 175 and is supported in the casing 89 at this point by means of an anti-friction bearing 176, the casing 89 being suitably formed at this point with a wall 69 for receiving the outer race of the bearing. A snap ring 178 engages a suitable recess in the wall portion 69 for retaining the bearing in position.

On the rear side of the partition wall 69, the portion 175 of the shaft 93 flares outwardly still further and is formed on its outer peripheral portion with spline teeth 123 which are adapted to engage a set of internal teeth 124 formed on an annulus gear 126. A snap ring 125 engages a slot cut in the gear and retains the gear against forward displacement.

The annulus gear 126 comprises the driving gear of a planetary gearset which also includes a sun gear 127 rotatably carried on the tail shaft 103 and a set of planet gears 128, the latter being rotatably mounted on axles 129 carried by a carrier 130. The latter is splined on the tail shaft 103 at 131 and is separated from the enlarged portion 175 of the shaft 93 by an anti-friction bushing 177 which permits relative rotation between the shaft 93 and the sun gear.

The annulus gear 126 is provided with teeth 180 which are adapted to be engaged by teeth 181 carried by a slidable clutch member R. The latter is carried by the carrier 130 for sliding movement relatively thereto. A blocker element 182 and a pair of overrunning roller clutch devices 183 and 184 are associated with the sleeve R in such manner that the sleeve is blocked against forward shift to engage the teeth 180 except when the speeds of the sleeve and the annulus gear 126 are synchronous. When the sleeve R is in the Fig. 9 position the drive from shaft 93 to 103 is a reduction drive through the planetary gears, the sun gear 127 being prevented from reverse rotation by the overrunning rollers 184 which lock said gear to the rear casing extension 185.

When the sleeve R is engaged with the annulus 126, the shaft 103 is driven directly from the shaft 93. The functions of the overrunning roller clutch 183 and of the other parts of the blocker mechanism not referred to are fully described in the aforesaid copending application of Carl A. Neracher, et al.

Clutch sleeve R is shiftable by a shift yoke 202 which rotatably engages the same in the usual manner. The yoke 202 has an integral elongated boss portion 203 which is slidably carried on a shift rail 204, the latter being mounted in a pair of axially aligned bosses of a cover 205 fastened to the casing 89 on the right hand side thereof (looking forwardly of the vehicle) as illustrated in Fig. 12. The yoke boss portion 203 has integrally formed thereon a pair of spaced lugs 206 adapted to receive between them the rounded end 207 of a shift lever 208 carried by a shaft 209. The latter is rotatably carried in a suitable bore in the cover 205 and at its outer end carries a second shift lever 210. The upper end of the lever 210 is operably connected by a link 211 with the opertaing rod 212 of the servo-motor F.

The servo-motor F in the present embodiment is of the so-called vacuum type as the fluid medium used on the motor piston is rendered effective by subjecting the piston to the vacuum of the intake manifold of the engine (see Fig. 14). Thus, a chamber or cylinder 213 houses a piston 214 of the diaphragm type, the latter being fixed to a hollow piston rod 215 which has the front and rear abutment members 216, 217 assembled therewith in fixed relationship. Air under atmospheric pressure is unrestrictedly present in the chamber 218 as the flexible dirt seal 218' is not air tight. The other chamber 219 of the vacuum motor F is selectively placed in communication with either a source of pressure fluid different from atmospheric pressure such as the intake manifold of the engine A or else wtih the atmosphere when the chamber 219 is vented.

The motor housing 220 slidably receives the front end of the piston rod 215 and has a chamber 221 which is open to chamber 219 by a passage 222. Upper and lower valve seats 223, 224 define passages for respectively controlling the venting and vacuum supply to chambers 221 and 219. A second passage 225 through the motor housing 220 connects the chamber 221 with the outside atmosphere under certain conditions of operation and the chamber 221 is placed in communication with the low pressure of the intake manifold under other conditions of operation by way of chamber 226 and passage 227.

In order to control the admission of vacuum or atmospheric pressure into the chamber 219, we have provided an electrical solenoid L having an armature plunger 228 yieldingly urged downwardly by a spring 229. This armature plunger has a lower extension formed with valve parts 230, 231 adapted respectively to engage the valve seats 223, 224 thereby to close and open the passages through said seats. In Fig. 14 the solenoid L is shown in energized condition, the armature 228 being raised against spring 229 seating valve 231 and opening valve 230 thereby venting chamber 219 to the atmosphere by way of passage 222, chamber 221 and passage 225 and permitting piston 214 under certain conditions hereinafter set forth to move rearwardly under the action of a spring 232 to move clutch sleeve R to its disengaged position. In Fig. 15, the solenoid L is shown deenergized, the armature 228 having been lowered by spring 229 thereby setting valve 230 for opening valve 231 and cutting off communication between the chamber 221 and the atmosphere and opening chamber 221 to the vacuum supply, vacuum always being present in chamber 226 during operation of the engine A. Lowering of the pressure in chamber 219 causes piston 214 to move forwardly compressing spring 232 and moving rod 215 forwardly or to the left as viewed in Figs. 14 and 15.

In order to provide a yielding power transmission between piston 214 and clutch sleeve R, a thrust transmitting compression spring 233 is disposed within the hollow rod 215, one end of the spring being seated on the abutment 217 and the other end being seated on a head 234 of a rod 235 which extends through spring 233 as a forward extension of the rod 212. It may thus be seen that when piston 214 is forced forwardly by the action of the pressure fluid thereon, rod 212 and sleeve R may move forwardly only to the blocked position of the sleeve while the piston 214 may continue movement to the end of its stroke accommodated by loading of spring 233 against the head 234. Then when the mechanism has functioned to synchronize the teeth 180, 181, as will be explained later on in the description, rod 212 will be actuated by the preloaded spring 233 to move the clutch sleeve R forwardly into engaged position, the teeth 181 thereof meshing with the teeth 180 of the annulus gear 126.

In Fig. 15, the rod 212 has moved forwardly to the limit of its travel, the sleeve R being fully clutched whereas the piston 214 has overtravelled rod 212 to the extent of the gap 237 between abutment 217 and the end of the enlarged portion of the rod 212. When, with the parts positioned as shown in Fig. 15, solenoid L is energized to vent chamber 219, it will be apparent that rod 212 may remain stationary while spring 232 moves piston 214 rearwardly until the abutment 217 engages the shoulder 238 of rod 212. This arrangement is utilized to effect unloading of the clutch teeth 180, 181 whereby sleeve R may be shifted out of clutching position as will be presently made clear. Therefore, after the piston has closed the gap 237 in unloading the clutch teeth, spring 232 thereupon moves the piston 214 to the Fig. 14 position releasing the sleeve R.

The unloading of sleeve R is accomplished by the momentary grounding or shorting of the engine ignition system under control of an ignition interrupting switch N. This switch has terminals 239, 240 open as shown in Figs. 14 and 15 for normal operation of the engine ignition system and closed to render the ignition system inoperative in conjunction with further controls to be described. The switch terminals are bridged and the switch thereby closed by a movable contact 241 in the form of a reciprocable plunger resting on a ball detent 242 which in Fig. 14 is seated in groove 243 of rod 215 thereby allowing switch spring 244 to hold contact 241 away from the terminals 239 and 240.

When the piston 214 is at the limit of its pressure fluid operated stroke (Fig. 15), a second groove 245 receives the ball 242 to allow switch N to remain open. However, whenever the piston moves between the Fig. 14 and Fig. 15 positions, switch N is closed and depending upon other conditions, the engine ignition may then be interrupted. Thus, when the motor F is vented in Fig. 15 position, the piston 214 in taking up gap 237 will cause ball 242 to close the switch at the completion of the rearward stroke of the piston the ball will enter groove 243 and the switch will be opened.

In order to latch the sleeve operating means into clutch engaging position so that once the motor F has been operated by pressure fluid to engage the clutch sleeve R with the annulus gear 126, the sleeve will not thereafter tend to disengage because of variations in the pressure on opposite sides of the piston 214, a mechanism is provided which operates independently of the fluid pressure operated means. This mechanism also permits the pressure fluid to load the sleeve operating means for clutching shift in advance of actual clutching of the sleeve R so that loss of pressure fluid after loading will not effect the subsequent clutching engagement of the sleeve. This feature is particularly advantageous in connection with the use of intake manifold vacuum for operating the piston because the presence of a vacuum depends of course upon the throttle valve opening and accelerator pedal position.

The latching mechanism comprises a latch member 246 pivoted at 247 in chamber 228 and yieldingly urged downwardly by "rat trap" spring 248 so that when solenoid L is deenergized, the lower end of the latch will engage the forward end of a latch groove 249 in rod 215 when the piston 214 is urged forwardly on its power stroke, to thereby hold the piston in the Fig. 15 position independently of the continued presence of vacuum in chamber 219.

The latch member 246 has a pair of in-turned lugs 250 (Fig. 16) which when the parts are in their Fig. 15 position overlie a shoulder 251 formed on the lower end of the plunger 228, there being a clearance between the shoulder and lugs so that latch 246 may seat independently of the seating of the armature valve part 230 such that when the solenoid L is energized to vent motor F, the armature 228 will have a certain freedom of movement for a hammer-blow contact with the lugs 250 so as to insure release of latch 246 from groove 249.

As a means of manually engaging clutch sleeve R with the teeth 180 of the annulus gear 126 in cases where the vacuum supply fails, we have provided independent control devices operable by the driver and best shown in Figs. 1, 7, 14 and 15. The vehicle dash 252 carries a knob 253 connected to a Bowden wire mechanism 254 with the abutment 216 so that when the driver pulls the knob, the piston 214 will be moved forwardly the same as though pressure fluid was causing its power stroke and clutch sleeve R will be engaged.

Inasmuch as the solenoid L will ordinarily be deenergized at this time, the latch 246 will function to hold the sleeve engaged but it is desirable with our illustrated arrangement to render the solenoid L inoperable to unlatch the rod 215 if there is no vacuum so that the piston 214 will stay in the Fig. 15 position after the above described manual operation. To this end we have provided a dash switch P (Fig. 7) which comprises a pair of electrical terminals 255, 256 normally bridged to close the switch by a spring contact piece 257 held in position by a suitable dog 258 fixed to the Bowden wire 254. When the knob 253 is in its inoperative position as shown in Fig. 1, the contact piece 257 of switch P completes a circuit (to be described later) between terminals 255, 256 but when the knob is pulled out to effect manual clutching operation of the sleeve R, the dog 258 moves to the position 258' and contact piece 257 springs downwardly to the position 257' to open switch P which will thereby maintain solenoid L deenergized so that latch 246 may function.

Referring now to Figs. 12 and 17, it will be seen that the motor E which actuates the sleeve Q is similar to the motor F except for changes made necessary because of the necessity for providing an intermediate piston position corresponding to the neutral position of the sleeve.

The motor E is supplied with vacuum through a pipe 260 which leads from the intake manifold to a valve V. The valve V has a stem 261 formed integrally with the plunger 262 of a solenoid 263. A spring 264 urges the stem downwardly against the seat 265 to cut off vacuum from pipe 266 which leads to chamber 262 of motor E. When solenoid 263 is energized, the plunger 262 moves upwardly and opens the pipe 266 to suction. The piston rod 268 is provided with two latch grooves 269, 270 for reception of the latch member 271 which is adapted to latch the rod in direct and neutral positions. The rod 268 is connected through a rod 272 to the shift lever 146, a spring 273 being arranged between the rods to provide a lost motion connection similar to that described above in connection with motor F.

The diaphragm 274 is moved in one direction to shift the sleeve Q into low range driving position by a spring 275 and in the opposite direction to shift the sleeve into direct driving position by vacuum admitted through passage 276. A vent passage 277 is also provided.

Whenever the car is being driven, the countershaft cluster 97 is drivingly connected with the intermediate driven shaft 93 and this relationship is conveniently utilized for controlling the automatic operation of the sleeve Q as a function of car speed in a manner now to be described.

Referring to Figs. 9 and 13, it may be seen that the cluster gear 107 drives a worm 278 having a shaft portion which drives a governor controlled speed responsive switch G of any suitable type. The switch mechanism G is so constructed that a differential is effected in the operation thereof such that as the car is accelerated or brought to a stop the switch G is caused to close at a much slower car speed than that required to open the switch although such relationships may be varied as desired. However, for reasons presently apparent, we prefer to hold the switch G open during normal stopping of the car in traffic until the car in its direct speed ratio has been decelerated to a speed slightly less than the normal idling speed of the engine A in order that the reversal of torque necessary to unload the clutch sleeve Q may be effected.

Referring now to Figs. 10-13, it may be seen that the trunnion 134 is provided with a tab 280 which is adapted, when the finger 133 is in engagement with the yoke 112, to engage a plunger 281 of a switch 282 when the rockshaft 135 is rocked in a clockwise direction in Fig. 12. This action closes the switch 282 thereby energizing solenoids L' and 263 (as will be explained in detail) and effects release of the latch 271 from the groove 269 while at the same time opening the pipe 266 to suction.

The switch 282 is in such position that the plunger 281 thereof is not engaged by the tab 280 when the finger 133 is engaged with the reverse yoke 120 and a pin 283 is disposed (Fig. 10) in such position with relation to the tab 280 that it holds the trunnion 134 in its rocked position while the reverse gear 118 is engaged thus preventing accidental unlocking of the motor push rod 272.

A switch 284 is mounted in the casing in such position that the plunger 285 thereof is engaged by the reverse rail 138 when the latter is in neutral position. The switch 284 is closed under such conditions and opens by spring pressure in response to shift of the rail 138. When the switch opens the motor F is rendered inoperable to shift sleeve R into kickdown position as will be presently made clear.

Referring to Fig. 18, it may be seen that the vehicle battery 286 is connected to ground at 287 and to the starting motor 288 by a wire 289. From the starting motor, a wire 290 is connected to the vehicle ammeter 291 and a wire 292 leads to the ignition switch 293. From the ignition switch a wire 294 leads to one side of the solenoid L to which it is connected by a jumper 295, the other side of the solenoid L being connected by a wire 296 and through switches 284 and P to the kickdown switch 77, the other side of which is connected to ground at 297.

The wire 296 connects with a wire 298 which leads to one side of the ignition grounding switch N and the other side of the switch N is connected through a wire 299 with a wire 300 which leads through a clutch pedal actuated switch 301 to the distributor 302. A jumper wire 303 connects the distributor with the ignition coil 304, the other side of said coil being connected to the hot wire 294 by a jumper 305. The hot wire 294 also leads through the switch 282 to one side of the solenoid L' of the motor E to which it is connected by the jumper 306. The other side of the solenoid L' is connected through a wire 307 to one side of the governor switch G, the latter being grounded at 310.

The wire 307 also connects with one side of the ignition grounding switch N', the other side of this switch being connected with the wire 300 which leads through the clutch pedal switch 301 to the distributor and ignition coil. The actuating solenoid 263 of the valve mechanism V is connected by a jumper 311 to the wire 294 and is grounded at 312.

The operation of the transmission is as follows:

Let it be assumed that the motor vehicle is at rest with the engine stopped, the ignition switch 293 in the off position and the manually shiftable control lever 165 in neutral. Under such conditions, there will be no current on in any of the actuating circuits of Fig. 18. Therefore the motor E will be in the condition shown in Fig. 17, the latch member 271 being engaged with the groove 269 under the influence of the spring 229', thereby locking the actuating rod 268 in the position corresponding to the neutral position of the sleeve Q. The valve member 261 of the valve V will be positioned as shown in Fig. 17, the spring 264 of the solenoid 263 urging the plunger 262 downwardly, closing the valve and cutting off the vacuum from the motor E. The sleeve R will be engaged with the annulus gear 126, the motor F being in the position shown in Fig. 15 with the actuating rod 215 locked in the direct drive position by the latch member 246, the spring 229 urging the plunger 228 to such position that the rod 215 remains locked in direct drive position whenever the solenoid L is deenergized. It will be noted in this connection that the sleeve R is normally in direct drive position when the vehicle is brought to rest with the manual control in neutral, vacuum being then "on" in the motor F, and although the vacuum is lost when the engine is stopped, the sleeve R is retained in direct drive position by the latch 246 as aforesaid, since the solenoid L circuit is then open.

As soon as the ignition switch 293 is turned on preparatory to starting the engine A by the usual starting apparatus, wire 294 will be connected to the battery 286. The position of sleeve R will not be disturbed, however, because the circuit to ground through the solenoid L is incomplete, the kick-down switch 77 being open. The circuit to the solenoid L' and the solenoid 263 is also incomplete because under the aforesaid conditions, the switch 282 is open. Therefore, the sleeve Q will remain in the neutral position.

In order to set the transmission mechanism for forward drive, the operator depresses the clutch pedal 84 thereby releasing the main clutch C and swings the manually operable shift lever 165 in a clockwise direction while holding it in its lower path of movement, which action shifts the finger 133 of the trunnion 134 away from the projection 131 of the yoke 112 to low range position due to the lost motion connection therebetween and closes the switch 282 by engagement of the tab 280 of the trunnion with the plunger 281 thereof. Immediately that the switch 282 is closed, solenoid L' and solenoid 263 are energized. The plunger 228' of solenoid L' moves upwardly to unlatch the rod 268 and at the same time cut off communication between the chamber 267 and the chamber 218' of the motor E. Spring 275 will thereupon immediately thrust the diaphragm 274 forwardly which action swings the lever 146 (Fig. 12) clockwise about the shaft 145 and shifts the yoke 112 rearwardly of the transmission thereby engaging the sleeve Q with the clutch teeth 110 of the low range driving gear 109. At the same time the plunger 262 of solenoid 263 has moved upwardly, opened the valve and established communication between the pipe 260 and pipe 266. In view of the fact that the clutch pedal 84 is depressed at this time, the sleeve Q will undoubtedly move into engagement with the clutch teeth 110 without interference by the blocker teeth 117. Therefore the spring 273 of the motor E has no function at this time.

The driver may then engage main vehicle clutch C and accelerate the vehicle forwardly, the drive from the engine A being transmitted to the rear wheels through the coupling B, clutch C, main drive pinion 90, gears 96, 106, 109, sleeve Q, hub 104, shaft 93 and shaft 103. The planetary gearing in the rear of the transmission casing then being locked up in 1 to 1 ratio as aforesaid. As mentioned in the first part of the specification, it has been found that with the above arrangement of gearing, a starting ratio of 7.00 to 1 may be obtained, which ratio provides satisfactory breakaway particularly when used with a fluid coupling.

Should the teeth of sleeve Q dead end against teeth 110 or teeth 117 when the latch is released, the spring 275 will remain compressed and the sleeve will be biased toward its engaged position. Immediately upon slight rotation of shaft 93 when the clutch is engaged, the sleeve Q will complete its rearward movement to engage teeth 110.

When the vehicle has been accelerated to a speed at which the contacts of the governor switch G open (for example, 15 M. P. H.), the solenoid L' will be deenergized (the switch 282 being closed since the manual shift lever is still in forward position and will normally be maintained there except when the vehicle is to be set for reverse drive) and solenoid plunger 228' will be moved downwardly by spring 229' cutting off communication of the motor cylinder of motor E with the atmosphere and opening the chamber 218' to suction through passage 276 whereupon piston diaphragm 274 will thrust rearwardly compressing springs 275 and 273. This movement will shift the rod 268 to such position that the groove 270 will receive the latch member 271 and the rod will be retained in its shifted position regardless of vacuum conditions existing in the manifold. During the movement of the rod 268 from its low range position to high range position, the switch N' will be momentarily closed. This closing of the switch N', however, has no function at this time since the switch G is in open circuit position and, when it takes place under conditions during which the vehicle is being accelerated, is unnoticeable.

When the rod 268 of the motor E is latched in its high range position, spring 273 is exerting a rearward thrust on shift lever 146 and consequently sleeve Q is urged forwardly. However, because of the driving load on the internal teeth of the sleeve Q, the latter cannot be shifted until torque is relieved, which action may be accomplished by momentary release of the accelerator pedal. At the instant the accelerator pedal is released and the driving torque of the motor drops, the driving force imposed on the teeth 102 of the sleeve Q by the clutch teeth 110 of the gear 109 will be relieved and the sleeve Q will be rapidly shifted forwardly out of engagement with the clutch teeth 110 and toward engagement of clutch teeth 101 of main drive pinion 90. The sleeve Q, however, will not shift into engagement with the clutch teeth 101 until the pinion 90 and shaft 93 which carries the sleeve Q are rotating at synchronous speed, engagement of the sleeve teeth with the clutch teeth 101 being prevented by the action of the blocker member 114 in the well known manner. However, as the throttle has been closed by release of the accelerator pedal, pinion 90 which has been rotating at a faster rate than shaft 93 falls off in speed with the engine and at the instant that the rotational speed of the pinion 90 falls to the speed of the shaft 93 and sleeve Q, the latter will be shifted through the blocker teeth to engage the clutch teeth 101. The sleeve Q is then in high range or direct drive position and depression of the accelerator pedal will result in the vehicle being driven in direct drive ratio.

The vehicle will continue to be driven in direct drive so far as the clutch sleeve Q is concerned so long as the speed of the vehicle is maintained above the speed at which the contacts of the governor switch G are designed to close. It has been found that a governor switch closing speed of approximately 10 M. P. H. is suitable for average driving conditions. When the governor switch G closes, solenoid L' is energized and plunger 228' moves upwardly unlatching the rod 268 and permit the spring 275 to thrust the rod 268 forwardly to take up the clearance existing between the head 217' and the rear end of rod 272. This clearance is slight and corresponds to the clearance 237 illustrated in Fig. 15 for the motor F and permits the rod 268 to move forwardly sufficiently to close the switch N', which action connects the distributor 302 to ground, thereby shunting the ignition system and relieving the driving thrust existing between the clutch teeth 101 and the sleeve Q. Upon release of said driving thrust, the spring 275 of motor E thrusts the rod 272 forwardly to the full extent of movement permitted the diaphragm 274 and the sleeve Q is shifted rearwardly into engagement with the clutch teeth 110 of the low range driving gear 109 under control of the blocker member 115 as hereinafter explained. The ignition system is restored at the instant that the sleeve Q reaches neutral position as can be readily understood by a reference to Fig. 17 wherein it may be seen that the groove 244' which is adapted to receive the ball operator of the switch N' is elongated in such manner that the switch N' is open in both neutral and low range position. The vehicle will thus be driven in low range until it is again accelerated to a speed above the opening speed of governor switch G whereupon the shift to high range may be accomplished by momentary release of the accelerator pedal as aforesaid. It should be noted that when the vehicle is being driven in high range, the speed of the pinion is the same as that of the shaft 93 while the gear 109 is being driven through the countershaft cluster 97 at a slower speed relatively thereto. Thus, the shift of the sleeve Q from high range to low range may be readily accomplished, the blocker 115 functioning to prevent engagement of the sleeve Q with the clutch teeth 110 until the speed of shaft 93 has dropped to that of the gear 109. If the operator should depress the accelerator pedal during the period that the sleeve Q is passing through neutral, the speed of the gear 109 will be increased and the shift will be made at the instant that it comes up to the speed of the shaft 93.

When it is desired to bring the vehicle to a stop, the clutch pedal 84 is depressed to disengage main clutch C and lever 165 is swung in a counterclockwise direction to neutral position whereupon the sleeve Q will be moved to neutral position against the force of the spring 275 and the switch 282 will be opened permitting the spring 229' to latch the rod 268 in neutral position. At the same time, solenoid 263 will be deenergized and the plunger 262 will cut off communication between the pipes 260 and 266. This latter action is necessary in order that the sleeve Q may be retained in neutral position because when the switch 282 is open to deenergize the solenoid L' to permit latching of the rod 268 in neutral, communication between chamber 267 and 218' of the motor E is established and unless the vacuum existing in pipe 266 is cut off, the sleeve Q would be moved to high range position, the latch 271 of course being incapable of latching the rod 268 against movement in both directions.

The kickdown mechanism for controlling the clutch sleeve R will now be described. This kickdown control functions to step down the drive from direct to a 1.45 to 1 underdrive ratio (5.14 to 1 over all with a 3.54 to 1 rear axle ratio) in high range and to a 10.25 to 1 ratio when the sleeve Q is in low range position. Assuming that the vehicle is being driven in high range with the sleeve Q in forward position and faster acceleration is desired than that obtainable through opening the vehicle throttle, depressing of the accelerator pedal to wide open throttle position will close kickdown switch 77 and establish the main kickdown circuit through wire 296 to solenoid L. This results in energization of the solenoid L which raises latch 246 and allows spring 232 to move diaphragm 214 and rod 215 rearwardly to take up gap 237. This closes switch N and established a kickdown ignition control circuit through wires 299 and 300 which interrupts the engine ignition and unloads clutch sleeve R, the latter thereupon being immediately shifted rearwardly from its direct drive position to its underdrive position illustrated in Fig. 9, the engine ignition being immediately restored upon the ball operating member of the switch N dropping into the foremost of the grooves 243. The action of the various parts of the servo-motor F can be readily understood by reference to Figs. 14 and 15. Fig. 15 shows the parts of the servo-motor F in the direct drive position while Fig. 14 shows them in kickdown position. Inasmuch as the accelerator must be fully depressed to cause operation of the kickdown mechanism, as soon as the ignition is restored the engine will rapidly speed up under wide open throttle conditions and the reaction through the planetary gearset will immediately cause lock-up of the sun gear 127 against the casing through the overrunning clutch 184 and the vehicle will be accelerated in underdrive at a reduced speed ratio which is adequate to provide high speed acceleration of the vehicle without unduly high engine R. P. M. The whole cycle of kickdown operation takes place very rapidly and smoothly and is entirely responsive to the natural movement of the accelerator pedal downwardly into kickdown position. This kickdown function is conveniently used as a fast accelerating drive for obtaining more favorable torque multiplication as, for example, when passing other cars on the road, climbing hills, etc. When the accelerator pedal 59 is released, a direct drive through the planetary gearset is automatically synchronously obtained. By preference, this direct drive is not restored after kickdown until the accelerator pedal 59 is substantially fully released, it being noted from the drawing that the finger 76 of the kickdown switch 77 will not be engaged by the finger 74 of the lever 73 until the accelerator pedal is substantially fully released. This prevents undesired operations of the kickdown mechanism and changes in the speed ratio within a narrow range of accelerator pedal movement and is more fully explained in the aforesaid copending application of Neracher et al., Serial No. 383,190. Therefore, the kickdown switch 77 when closed maintains the solenoid L energized and the solenoid is not deenergized to latch the piston rod 215, in direct drive position until the accelerator is substantially fully released, this release also serving to cause the vacuum to operate the piston rod forwardly thereby to shift sleeve R into engagement with the teeth 180 of the annulus gear 126 under synchronous control of the blocker 182.

When driving in low range below the speed at which the governor switch G operates to effect shift of the sleeve Q, the accelerator pedal may be depressed into kickdown range to effect release of the sleeve R and emergency low speed ratio drive will be immediately established in a manner similar to that just described. Likewise, ordinary low range speed ratio will be reestablished upon releasing of the accelerator pedal in the manner aforesaid. Kickdown of the sleeve R while the sleeve Q is in low range position provides an overall speed ratio reduction drive of 10.25 to 1 which provides sufficient torque multiplication for climbing steep hills, negotiating sandy roads, etc., besides enabling the vehicle to make an extremely fast breakaway from standstill.

The latter is accomplished by shifting the sleeve Q into low range preparatory to accelerating the vehicle from standstill and immediately depressing the accelerator pedal 59 to wide open throttle position upon engagement of main clutch C. Ordinarily, the vehicle would be accelerated in low range with the sleeve Q engaged with the clutch teeth 110 of gear 109 and the sleeve R in direct drive position with the teeth thereof engaged with the annulus gear clutch teeth 180. However, upon full depression of the accelerator pedal, the sleeve R is shifted rearwardly into kickdown position by operation of the above described kickdown control mechanism simultaneously with opening of the throttle to wide open position. When sufficient speed has been obtained in this speed ratio, an automatic shift to a higher ratio may be obtained by release of the accelerator pedal whereupon sleeve R will be shifted forwardly to direct drive position and further depression of the accelerator pedal will result in driving of the vehicle in low range speed ratio. If the vehicle is travelling at a speed above the operating speed of the governor switch G at the time the accelerator pedal is released, sleeve Q will also be shifted into high range or direct drive position through the action of the servomotor E and a shift from an extremely low speed driving ratio of 10.25 to 1 to direct drive ratio of 3.54 to 1 will have been accomplished. It may thus be seen that we have provided an extremely flexible vehicle driving mechanism which is automatically operable by power means in response to natural movements of the driver.

In order to drive the car in reverse, the driver releases the main clutch C and shifts the selector lever 165 clockwise of the steering column while holding the same in its upper path of movement whereupon the finger 133 of the trunnion 134 shifts the yoke 120 rearwardly to mesh the reverse idler 118 with gears 108 and 121. Upon restoration of the drive through main clutch C, the reverse drive then passes from the pinion 90 to gear 96, thence through gears 108, 118 and 121 to shaft 93.

As will be apparent from Figs. 11, 12 and 18, shifting of the reverse rail forwardly to mesh the reverse idler gear will cause the forward end of the rail to disengage the plunger 285 of the switch 284 and permit the switch to open. Opening of the switch 284 will break the circuit from kickdown switch 77 to solenoid L' and will prevent shifting of the sleeve R while driving in reverse. Kickdown operation of the sleeve R is therefore rendered impossible during reverse drive, the extremely low ratio drive obtainable thereby not being necessary.

The function of the knob 253 and switch P have already been explained and the significance of the clutch pedal operated switch 301 is as follows. If the ignition should be cut off at switches N or N' at any time when the condition of the sleeves R and Q is such that coast load is imposed on the teeth thereof, it might occur that the latch members 246 and 271 will be disengaged and the pistons of the motors E and F will have moved sufficiently to take up the clearance between the operating rods and the piston head such that the switches N and N' will be operated to ground the ignition. Under such conditions, the engine A is stalled and it is impossible to start the same unless the ignition system is reestablished. As can be seen from the wiring diagram of Fig. 18, depression of the clutch pedal 84 will open the switch 301 and the ignition will be restored to permit the engine to be started. As soon as the engine A is started, vacuum will be present in motors E and F and the pistons thereof will be moved to whatever positions the solenoids L and L' are set to provide. Thus, normal operating conditions will be restored.

It will thus be seen that we have provided a simple mechanism for providing automatic shifting in a four speed transmission in which the breakaway speed ratio differs from the kickdown speed ratio and in which an emergency breakaway gear for fast get-away is provided, all of the said speed ratios being established in response to natural functional operations of the vehicle driver operated controls.

We claim:

1. In combination with a motor vehicle transmission having a member shiftable from neutral position to a high-speed position and to a low-speed position for establishing different speed ratio drives through said transmission, a shift yoke operably engaging said member; a manually operable lever and a power operable lever engaging said yoke; power means for operating said power operable lever; and means operable by said manually operable lever while said yoke is in neutral position for rendering said power means operable to shift said member.

2. In combination with a motor vehicle transmission having a clutch member shiftable from neutral position to a high-speed position and to a low-speed position for establishing different speed ratio drives through said transmission, a shift yoke operably engaging said member; a fluid pressure motor connected to said yoke and adapted upon application of pressure fluid thereto to shift said member into high-speed position; a spring constantly urging said member into low-speed position; and holding means operatively associated with said member for holding the same in neutral position against the action of said spring and means including speed responsive means operable for releasing said holding means to permit shift of said clutch member.

3. In combination with a motor vehicle transmission having a clutch member shiftable from neutral position to a high-speed position and to a low-speed position for establishing different speed ratio drives through said transmission, a shift yoke operably engaging said member; a fluid pressure motor connected to said yoke and adapted upon application of pressure fluid thereto to shift said member into high-speed position; a spring constantly urging said member into low-speed position; holding means operatively associated with said member for holding the same in neutral position and in high-speed position against the action of said spring; and means including a solenoid and control means responsive to vehicle speed for releasing said holding means to effect shift of said clutch member by said motor.

4. In combination with a motor vehicle transmission having a clutch member shiftable from neutral position to a high-speed position and to a low-speed position for establishing different speed ratio drives through said transmission, a fluid pressure motor for shifting said member including a piston adapted to be shifted in one direction by fluid pressure and in the opposite direction by means of a spring; lock means for locking said piston in its fluid actuated position and in its neutral position; valve means associated with said motor for controlling the supply of fluid pressure thereto; and a solenoid for controlling said lock means and valve means.

5. In a vehicle power transmission having a clutch member shiftable from neutral to a high-speed position and to a low-speed position, a vacuum motor for shifting said member including a chamber having a piston therein adapted to be moved to low-speed position by the action of a spring and to high-speed position by admission of vacuum into said chamber on one side of said piston; a piston rod connected with said piston; electrically operable holding means operatively associated with said piston rod for holding the same in high-speed position, the same holding means being operable to hold said piston in neutral against the action of said spring; and means responsive to vehicle speed for controlling said holding means.

6. In a vehicle power transmission having a clutch member shiftable from neutral to a high-speed position and to a low-speed position, a vacuum motor for shifting said member including a chamber having a piston therein adapted to be moved to low-speed position by the action of a spring and to high-speed position by admission of vacuum into said chamber on one side of said piston; a piston rod connected with said piston; a valve for controlling said motor; electromagnetic means for controlling said valve; and holding means also under control of said electromagnetic means for holding said piston rod in high-speed position and in neutral position independently of the supply of vacuum and the action of said spring.

7. In a vehicle power transmission having a member shiftable from neutral to a high-speed position and to a low-speed position, a vacuum motor for shifting said member including a chamber having a piston therein adapted to be moved to low-speed position by the action of a spring and to high-speed position by admission of vacuum into said chamber on one side of said piston; a piston rod connected with said piston; a valve for controlling said motor; holding means for holding said piston rod in high-speed position and in neutral position; electromagnetic means for controlling said valve and said holding means so arranged that said holding means is effective only when said valve is open to vacuum; a second valve positioned between said first valve and the vacuum supply, and control means for said second valve, so constructed and arranged that vacuum is cut off from said first valve when said rod is moved to neutral position.

8. In a vehicle power transmission, a drive-establishing member shiftable from neutral to a high-speed and a low-speed position; a second drive-establishing member shiftable from neutral to a reverse drive position; a pair of shift yokes for shifting said members; a shift element adapted for selective engagement with said yokes; manually operable means for selectively engaging said element with said yokes; manually operable means for operating said element to shift said yokes; vacuum operated means for operating said element to shift one of said yokes; and means operable in response to operation of said shift element to engage the other yoke for rendering said vacuum operated means inoperable.

9. In a vehicle power transmission, a drive-establishing member shiftable from neutral to a high-speed and a low-speed position; a second drive-establishing member shiftable from neutral to a reverse drive position; shift yokes for shifting said members; a shift element adapted for selective engagement with said yokes; manually operable means for selectively engaging said element with said yokes; manually operable means for operating said element to shift said yokes; power operated means for operating the yoke for shifting said second member, and means operable in response to movement of said element to engage the reverse yoke for locking the other yoke in neutral position.

10. In a vehicle power transmission, a drive-establishing member shiftable from neutral to a high-speed and a low-speed position; a second drive-establishing member shiftable from neutral to a reverse drive position; a plurality of shift yokes one associated with each of said members for shifting said members; a shift element adapted for selective engagement with said yokes; manually operable means for selectively engaging said element with said yokes; manually operable means for operating said element to shift said yokes; power operated means for shifting the yoke associated with the first mentioned of said drive establishing members, and means operable in response to movement of said element to engage the said second member shifting yoke for locking said power shiftable yoke in neutral position, and rendering said power means inoperable.

11. In a motor vehicle power transmission, a shift yoke adapted to be shifted to establish a plurality of different speed ratio drives; a rockshaft; a shift finger carried by said rockshaft and adapted to engage said yoke whereby said yoke may be shifted when said rockshaft is rocked; manually operable means for rocking said rockshaft; a second rockshaft; a shift finger carried by said second rockshaft and disposed in engagement with said yoke; and power means for rocking said second rockshaft.

12. In a motor vehicle power transmission, a shift yoke adapted to be shifted to establish a plurality of different speed ratio drives; a rockshaft; a shift finger carried by said rockshaft and adapted to engage said yoke whereby said yoke may be shifted when said rockshaft is rocked; manually operable means for rocking said rockshaft; a second rockshaft; a shift finger carried by said second rockshaft and disposed in engagement with said yoke; power means for rocking said second rockshaft, and means for rendering said power means inoperative except when said manually operable rockshaft is set for forward driving.

13. In a vehicle power transmission, a shift yoke adapted for shifting from neutral position in one direction to a first drive-establishing position and in the opposite direction to a second drive-establishing position; manually operable means operable for effecting shift of said yoke to said first position from said neutral position; a lost motion connection between said yoke and said manually operable means operable to permit shifting of said yoke to said second position through the same neutral position while said manually operable means remains in its position corresponding to said first position; and power actuated means 14. In a vehicle power transmission, a shift yoke adapted for shifting from neutral position in one direction to a first drive-establishing position and in the opposite direction to a second drive-establishing position; manually operable means for effecting shift of said yoke to said first position; a lost motion connection between said yoke and said manually operable means operable to permit shifting of said yoke from said first to said second position while said manually operable means remains in said first position; means for latching said yoke in neutral position; and means operable in response to operation of said manually operable means to effect shift of said yoke to said first position for unlatching said yoke.

15. In a vehicle power transmission, a shift yoke adapted for shifting from neutral position in one direction to a first forward drive-establishing position and in the opposite direction to a second forward drive-establishing position; manually operable means for effecting shift of said yoke to said first position from said neutral position; a lost motion connection between said yoke and said manually operable means operable to permit shifting of said yoke to said second position through the same neutral position while said manually operable means remains in its position corresponding to said first position; means for latching said yoke in neutral position; means operable in response to operation of said manually operable means to effect shift of said yoke to said first position for unlatching said yoke; and a servo motor adapted for operation after said operation of manually operable means for shifting said yoke between said first and second positions.

16. In combination with a motor vehicle transmission having a member shiftable from neutral position to a low speed position and to a high speed position for establishing different speed ratio drives through said transmission, a shifter element operably engaging said member for shifting the same between said positions; a manually operable element for engaging said shifter element to shift the same, said element having a neutral and a speed ratio establishing position, a power operable element for engaging said shifter element to shift the same, power means for operating said power operable element to effect shift of said member by said shifter element, and means operable in response to movement of said manually operable element out of its neutral position while said member is in neutral position for rendering said power means inoperable to effect shift of said member by said power operable element.

17. A variable speed transmission for vehicle drives comprising a countershaft type change speed means adapted to provide a relatively slow forward speed ratio drive and a relatively fast forward speed ratio drive and including clutch means shiftable from a neutral position to a position establishing one of said forward speed ratio drives and shiftable from said one drive establishing position to a position establishing the other of said forward speed ratio drives, a manual drive selector having a neutral position and a forward drive position corresponding respectively to the neutral position and the said one forward speed ratio drive positions of said clutch means, power motor means for shifting said clutch means, holding means normally operable for maintaining said motor means conditioned to retain said clutch means in neutral position when the vehicle is at rest with the manual selector in neutral position, means responsive to operation of said manual selector to its said forward position for releasing said holding means and for conditioning said motor means to effect shift of said clutch means to establish the said one forward speed ratio drive, and means responsive to predetermined vehicle speed operable for effecting shift of said clutch means from the said one drive establishing position and for conditioning said motor means to effect shift of said clutch means to establish the other of said forward speed ratio drives, said speed responsive means also controlling said holding means to effect activation of the same to retain said clutch means in said other drive establishing position when established therein.

18. In a motor vehicle having an engine, a power transmission drive comprising; a driving structure adapted to receive drive from the engine, a driven structure adapted to receive drive from the driving structure, means operable to establish a plurality of different speed ratio drive relationships between the driving and driven structures including a shiftable member, a power motor operably connected with said member for shifting the same between neutral and one drive establishing position and between said one drive establishing position and a second drive establishing position, power control means for controlling actuation of said motor, holding means for holding said member, means for releasing said holding means, means operable for conditioning said holding means in released position while said shiftable member is established in one of said drive positions and speed responsive means for conditioning said holding means to hold said shiftable member in the other of said drive positions when established therein.

19. In a drive transmission for a vehicle having an engine; a driving structure adapted to receive drive from the engine; a driven structure adapted to drive the vehicle; a plurality of torque transmitting speed ratio driving means providing relatively different drives from said driving structure to said driven structure comprising a plurality of pairs of positively interengageable drive control members adapted for relative engagement and disengagement to control operation of said drives; a driver operable element adapted for movement to a forward drive indicating position and reverse; power shift means conditioned for operation in response to movement of said driver element to said forward drive indicating position for automatically biasing one of said pair of drive control members into engagement to establish a relatively slow starting speed ratio drive between said structures, means including governor means operably responsive at or above a predetermined speed proportionate to the rotative speed of one of said structures and while said driver operable element remains in said forward drive indicating position for so controlling said power shift means as to automatically effect disengagement of said one pair of drive control elements and incident to said disengagement to automatically bias a second pair of said drive control members into engagement thereby to establish a relatively faster speed ratio drive between said structures than that established by said one pair of members, one member of each of said pair of members being operably connected to each other.

20. In combination with a motor vehicle transmission having a member shiftable from a neutral position to a low speed position and shiftable to a high speed position, for establishing different speed ratio drives through said transmission; a shift yoke operably engaging said member; a manually operable lever engageable with said yoke and operable to a position for effecting movement of said yoke to establish said member in said low speed position; an independent power operable lever also engageable with said yoke and operable to effect movement of said yoke to establish said member in said high speed position; power means for operating said power operable lever; and control means operable by said manually operable lever for controlling operation of said power means, said control means being so arranged and constructed as to be actuated by said manually operable lever when the latter is operated to effect establishment of said member in low speed position whereby to render said power means operable to effect establishment of said member in said high speed position.

21. In combination with a motor vehicle transmission having a member shiftable from neutral position to a high speed position and to a low speed position, for establishing different speed ratio drives through said transmission; a shift yoke operably engaging said member; manually operable lever means and power operable lever means operably engageable with said yoke for effecting movement of the latter to shift said member, said manually operable lever means being adapted to effect movement of said yoke to establish said member in low speed position and said power operable lever means being adapted to effect movement of said yoke to establish said member in said high speed position; power means for operating said power operable lever means; and control means for rendering said power means operable including speed responsive means and means operable by said manually operable lever means when effecting movement of said yoke to establish said member in said low speed position.

22. In combination with a motor vehicle transmission having a member shiftable from a neutral position to a low speed position and shiftable to a high speed position, for establishing different speed ratio drives through said transmission; a shift yoke operably engaging said member; a manually operable lever engageable with said yoke and operable to positions for effecting movement of said yoke to establish said member in either of its said low and high speed positions from said neutral position; a power operable lever also engageable with said yoke and operable to effect movement of the latter to establish said member in said low or high speed positions; power means for operating said power operable lever; and control means operable by said manually operable lever for controlling operation of said power means, said control means being so constructed and arranged whereby said power means will be conditioned to effect movement of said shift yoke to establish said member in its said low speed position upon movement of said manually operable lever to its position corresponding to low speed position of said member.

CARL A. NERACHER.
WILLIAM T. DUNN.

REFERENCES CITED

The following references are of record in the file of this patent:

UNITED STATES PATENTS

| Number | Name | Date |
|---|---|---|
| 2,206,221 | Carter | July 2, 1940 |
| 2,152,914 | Price et al. | Apr. 4, 1939 |
| 2,292,325 | Lawler | Aug. 4, 1942 |
| 1,990,690 | Hantschel et al. | Feb. 12, 1935 |
| 1,277,299 | Duncan | Aug. 27, 1918 |
| 1,886,003 | Garrison | Nov. 1, 1932 |
| 2,031,067 | Rauen et al. | Feb. 18, 1936 |
| 2,162,937 | Carter et al. | June 20, 1939 |
| 2,199,095 | Banker | Apr. 30, 1940 |
| 2,257,674 | Dunn | Sept. 30, 1941 |
| 2,277,800 | Syrovy | Mar. 31, 1942 |
| 907,711 | Anthony | Dec. 29, 1908 |
| 1,185,528 | Oddie | May 30, 1916 |
| 2,162,937 | Carter et al. | June 20, 1939 |
| 2,181,963 | Carter et al. | Dec. 5, 1939 |
| 2,308,113 | Schjolin | Jan. 12, 1943 |
| 2,296,289 | Mayrath | Sept. 22, 1942 |
| 2,141,096 | Thurber | Dec. 20, 1938 |
| 1,544,909 | Josephs, Jr., et al. | July 7, 1925 |

FOREIGN PATENTS

| Number | Country | Date |
|---|---|---|
| 321,186 | Italy | Sept. 26, 1934 |